Figure 1:
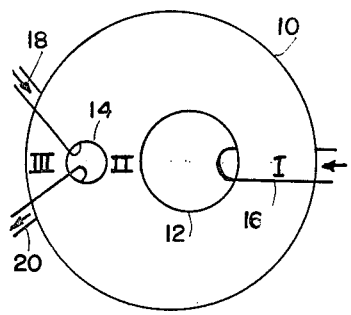

Feb. 8, 1966 V. J. KORKOWSKI 3,234,527
TRANSFLUXOR READING AND WRITING
Filed March 21, 1961 5 Sheets-Sheet 1

BLOCKED "O"

UNBLOCKED "1"

READ SEQUENCE

WRITE SEQUENCE

INVENTOR
VINCENT J. KORKOWSKI
BY Cushman, Darby & Cushman
ATTORNEYS

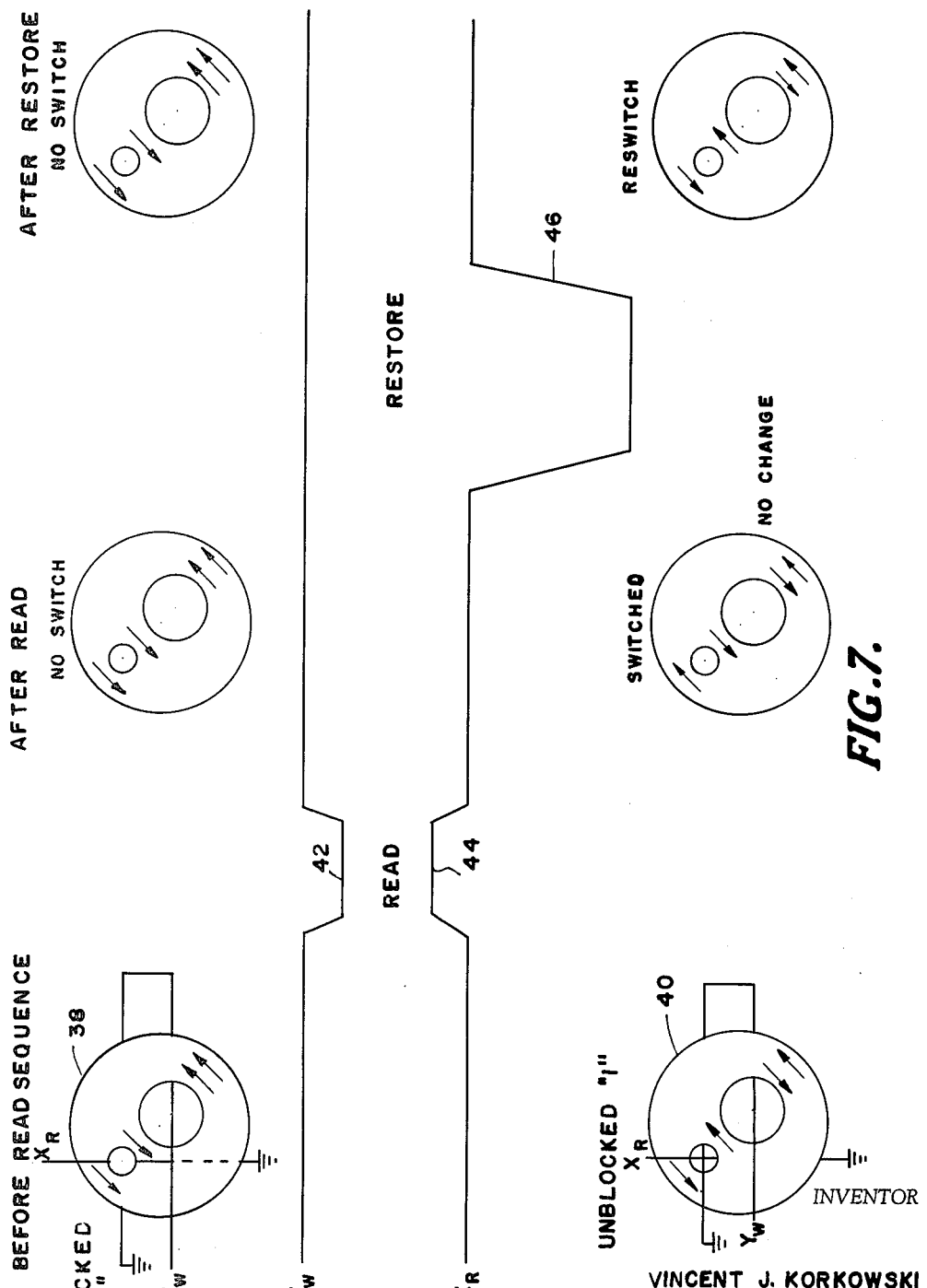

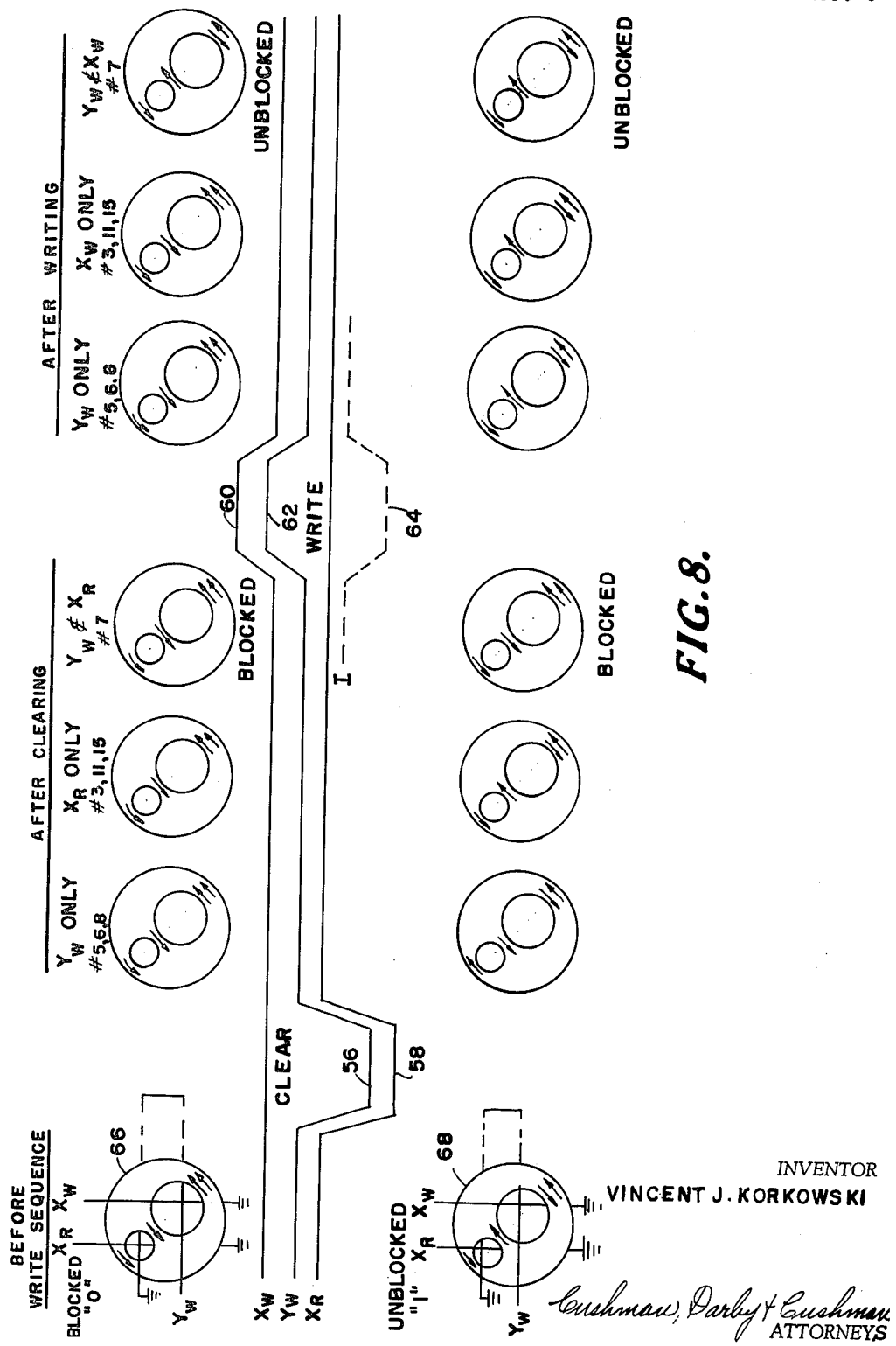

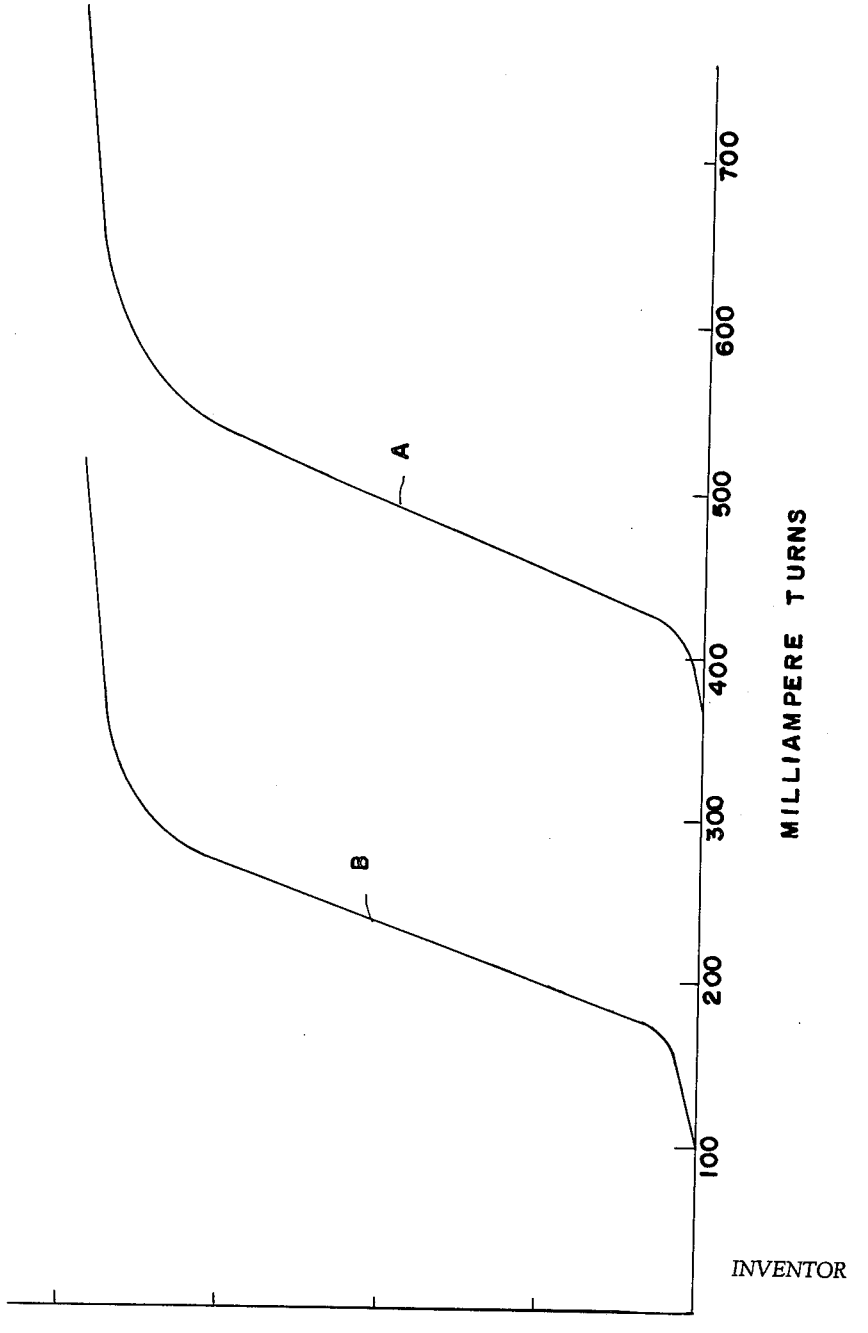

United States Patent Office 3,234,527
Patented Feb. 8, 1966

3,234,527
TRANSFLUXOR READING AND WRITING
Vincent J. Korkowski, Richfield, Minn., assignor to Sperry Rand Corporation, New York, N.Y., a corporation of Delaware
Filed Mar. 21, 1961, Ser. No. 97,334
11 Claims. (Cl. 340—174)

This application relates to transfluxor type magnetic cores and arrays thereof, and particularly to reading and writing information into such cores.

Multi-apertured ferrite cores and their conventional operation have been described heretofore, for example, in the Rajchman and Lo article entitled "The Transfluxor," beginning on page 321 of the March 1956 "Proceedings of the IRE." Such cores have been termed "transfluxors." The present invention utilizes a two-apertured transfluxor, though more apartures may be present if desired. The apertures are of different diameters for purposes of this invention. One of the features of this invention is the writing of information into a transfluxor type core via a line threading both of the apertures. Generally, another writing line threads only the larger aperture for coindicent-current operation. By utilizing both of these lines, opposite polarity fluxes may be concurrently applied to a core to "clear" it, i.e., to change it to, or leave it in, a blocked state, without danger of destroying information in unselected cores, and the subsequent writing pulse can be greater without danger of over-setting, but yet increase writing speed.

Figure 2A:
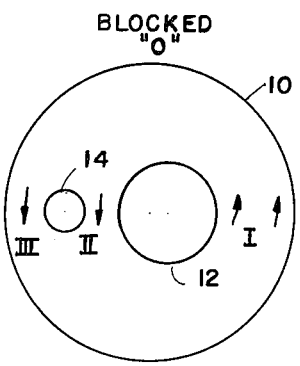
Figure 2B:
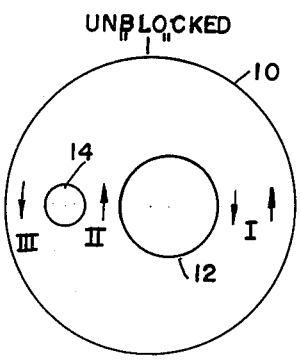
Figure 4:
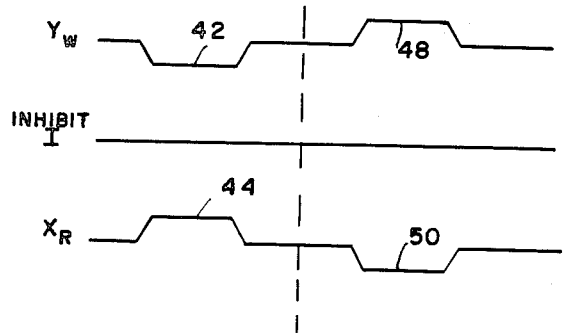
Figure 3:
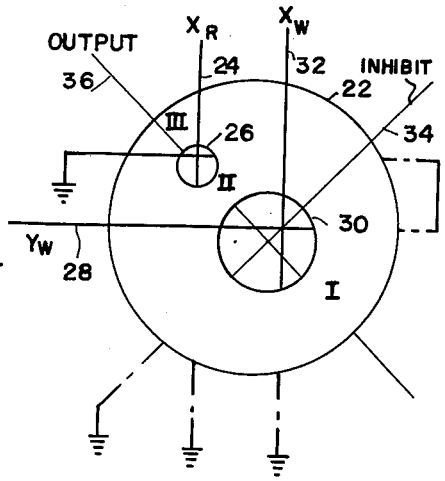
Figure 5:
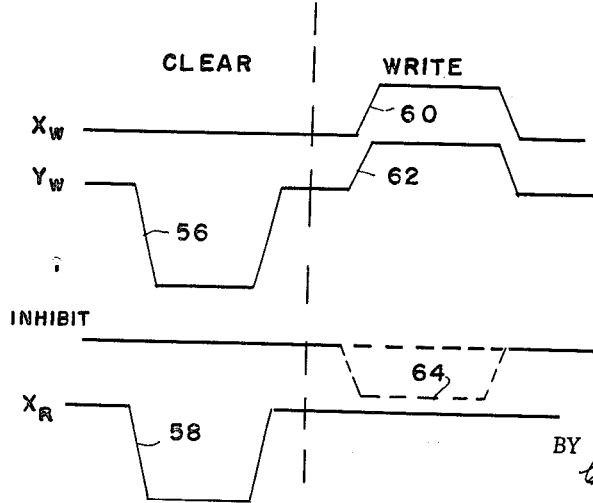

The objects of this invention are in accordance with the foregoing and subsequent features and advantages herein set forth, and other objects and advantages will become apparent from the following description and claims with reference to the drawing, in which:

FIGURE 1 illustrates a conventional transfluxor structure,

FIGURES 2A and 2B indicate blocked and unblocked flux conditions of a transfluxor, FIGURE 3 illustrates a transfluxor wired in accordance with this invention, FIGURES 4 and 5 depict exemplary waveforms utilizable with the circuitry of FIGURE 3.

Figure 6:
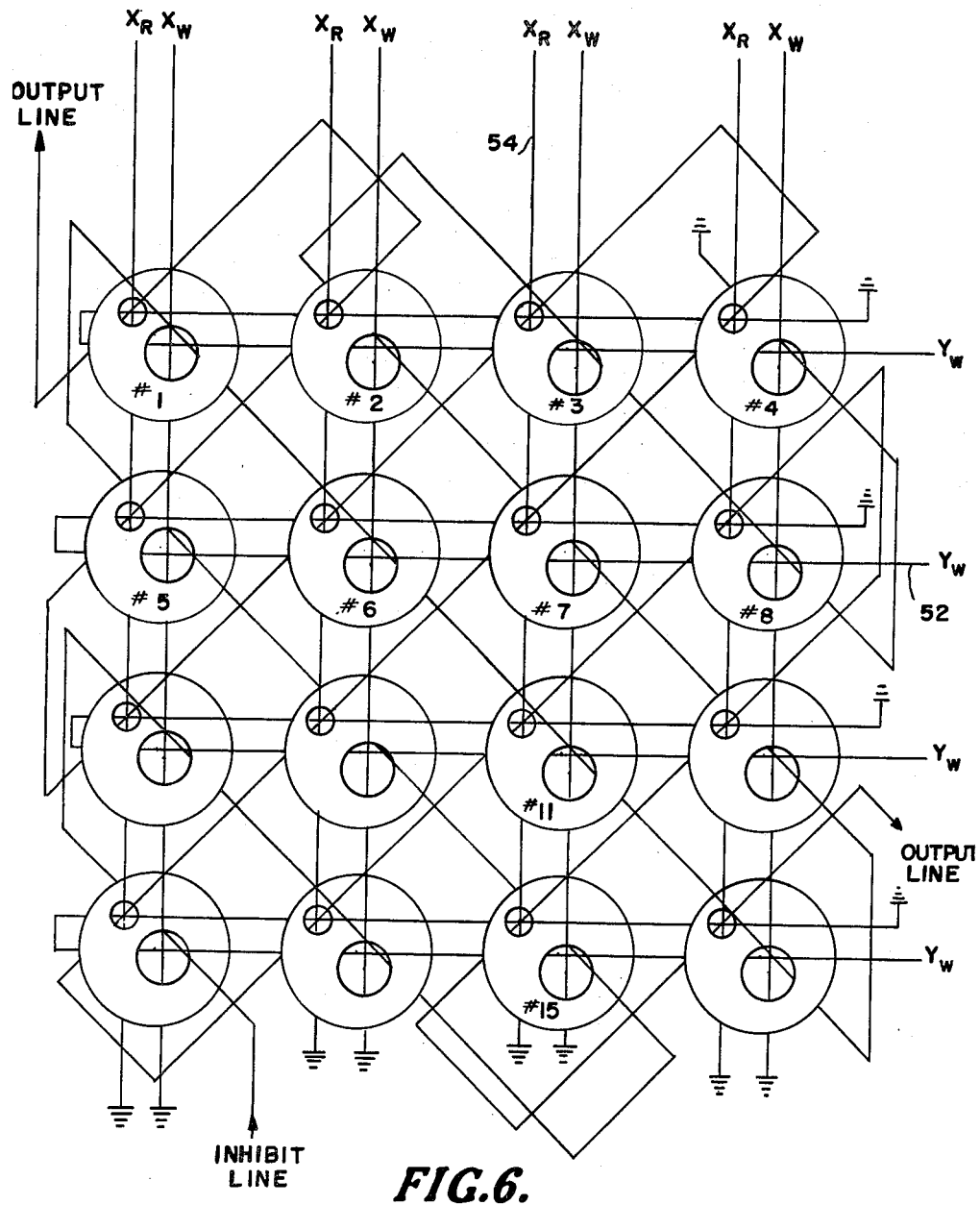

FIGURE 6 shows an array of transfluxors wired in accordance with this invention, FIGURE 7 is a diagram for explaining a Read sequence, FIGURE 8 is a diagram for explaining a Write sequence, and FIGURE 9 is a graph of exemplary operating curves for a transfluxor.

The conventional transfluxor 10 in FIGURE 1 may be made of magnetic material such as a molded ceramic ferrite which has a nearly rectangular hesteresis loop and consequently a resultant remanent induction substantially equal to the saturation induction. Though circular as to its outer diameter, any other peripheral configurations may be employed. Apertures 12 and 14 are of unequal diameter with the latter being smaller than the former, preferably by a ratio of approximately three to one. Other exemplary dimensions of the core of FIGURE 1 are, in inches: thickness 0.025, O.D. 0.200, aperture 12 diameter 0.095, aperture 14 diameter 0.038, distance between aperture centers 0.097, with the larger aperture's center being disposed 0.0155 from the center of core 10.

In general, apertures 12 and 14 are of such size and so disposed that the magnetic material portion between aperture 12 and the adjacent outer edge of core 10 forms a distinct leg I, the portion between the apertures leg II, and the portion between the smaller aperture and the adjacent outer edge of core 10 leg III, with the areas of the cross-sections of legs II and III being substantially equal and the cross-section of leg I being equal to or greater than the sum of those of legs II and III.

As a review of conventional operation of a transfluxor apparatus such as that illustrated in FIGURE 1, assume that at first an intense current pulse is sent through winding 16, which links leg I, in a direction to produce a counterclockwise flux flow which saturates legs II and III, for example as shown in FIGURE 2A. This is possible since the leg I provides the necessary return path since it too is thereby saturated in a counterclockwise direction. Legs II and III will remain saturated after the termination of the pulse since remanent and saturated inductions are almost equal. When a bipolar current signal is applied, then, via winding 18 so as to cause a magnetomotive force (M.M.F.) along a path surrounding the smaller aperture, but of insufficient amplitude to produce sufficient flux change around both apertures, that force when in a counterclockwise sense tends to produce an increase in flux in leg III and a decrease in leg II. But no increase in flux is possible in leg III because it is saturated. Consequently, there can be no flux flow at all, since magnetic flux flow is necessarily in closed paths. Similarly, when the M.M.F. is in its opposite sense, i.e., clockwise, it tends to produce an increase in flux in leg II, which is again impossible since that leg is saturated. Consequently, flux flow is "blocked" as the result of the direction of saturation of either leg II or III. Accordingly, the transfluxor is in its "blocked" state, and no voltage is induced in output winding 20, which also links leg III though it may link leg II as well. For binary operation, the "blocked" condition may be considered a 0 state.

If now a current pulse is applied via winding 16 in a direction and intense enough to produce a clockwise magnetizing force in the closer leg II larger than the coercive force thereof, but not large enough to allow the magnetizing force in the more distant leg III to exceed the critical value, the saturation of leg II will be reversed and become directed upwards as shown in FIGURE 2B, but the saturation of leg III is not effected. The net flux in leg I becomes substantially zero.

With the saturation in legs II and III being, as shown in FIGURE 2B, in opposite circumferential directions as to the whole core, a clockwise phase of M.M.F. as produced by a signal on line 18 of FIGURE 1 will reverse the flux flow around aperture 14, i.e., saturation in leg II becomes directed downwards while that in leg III becomes directed upwards, but the condition of leg I is not effected. Then a counterclockwise M.M.F. phase around aperture 14 will reverse the flux flow around the aperture again. This reversal and re-reversal of flux flow around aperture 14 may be carried on indefinitely, and may be thought of as a back-and-forth "transfer" of flux between legs II and III, which will induce a voltage in the output winding 20. Such a continuation of a transfluxor is referred to as its "unblocked" or "maximum set" state, which may conveniently be referred to as a binary 1 state.

From the foregoing, it is apparent the transfluxor is blocked when the directions of remanent induction of the legs adjacent the smaller aperture are the same, and unblocked when they are opposite. In the blocked state, the magnetic material around the small aperture provides essentially no coupling between the primary or reading winding 18 and the secondary or output winding 20; while it provides a relatively large coupling between these two windings in the unblocked state. The information as to whether the transfluxor is blocked or unblocked can be thought of as being stored in terms of the flux through leg I, and this stored flux does not change when an output is produced by interchange of flux between legs II and III.

In accordance with this invention, the transfluxor type magnetic core 22 of FIGURE 3, which core may physically be in all respects the same as indicated for core 10 in FIGURE 1, is provided with windings such as illustrated. These windings include an $X_R$ line 24 which threads the smaller aperture 26 to ground and links leg III; a $Y_W$ line 28 which threads the larger aperture 30 and also the smaller aperture 26 to ground so as to link leg II; an $X_W$ line 32 which threads the larger aperture 30 to ground and links leg I; an inhibit line 34 which also threads the larger aperture to ground and links leg I; plus an output line 36 which threads only the smaller aperture 26 and links leg III, though it could link leg II except production technique would be more difficult.

In the operation of transfluxors in accordance with this invention, particularly in a memory system, there is effected a read sequence or cycle and a write sequence or cycle. The read sequence normally includes a reading time and a restore time, while the write sequence includes a clearing time and a writing time. Reference is made to FIGURES 4 and 5 for exemplary indications of the pulses which may be applied in both a read and write sequence. As indicated in FIGURE 4, no signal is applied to either the $X_W$ or inhibit line during a read sequence, but during the reading time thereof opposite polarity pulses 42 and 44 and respectively applied to the $Y_W$ and $X_R$ lines, and during the restore time these latter two lines, in the embodiment referred to in FIGURE 4, again respectively carry opposite polarity pulses 48 and 50 which, though are opposite in polarity also to the respective read pulses 42, 44 but of similar magnitude.

As shown in FIGURE 6, the transfluxor of FIGURE 3 with its winding arrangement, is multiplied into a four by four array. In this array, there is a different $X_R$ line for each column of transfluxors, with each $X_R$ line threading the smaller aperture and linking leg III of each transfluxor in its respective column. There is also a different $X_W$ line for each different column of transfluxors, and each $X_W$ line threads the larger aperture and links leg I of each core in its respective column. Similarly, a different $Y_W$ line exists for each different row of transfluxors. Each $Y_W$ line serially threads the larger apertures of the transfluxors in its respective row and then returns with a serial threading of the smaller apertures of the transfluxors in the same row, thereby linking leg II of the cores in its row. Also illustrated in FIGURE 6 is an inhibit line which threads the larger aperture and links leg I of each of the cores in the array, and an output line which serially threads each smaller aperture and links leg III of all the cores in the array.

It will be understood by those skilled in the art that at times some of the transfluxors in FIGURE 6 will be in a blocked or 0 state, while others are in an unblocked or 1 state. In order to describe the read sequence, reference is now made to FIGURE 7.

In FIGURE 7, core 38 is assumed to exist in a blocked condition before the initiation of a read sequence, while core 40 is assumed to pre-exist in an unblocked condition, as illustrated by the flux arrows respectively on the cores. Between the two rows of cores in FIGURE 7 are signal waveforms respectively for the $Y_W$ and $X_R$ lines which are shown associated with core 38 and 40 in the same manner as in FIGURES 3 and 6. (The $X_W$, inhibit, and output lines are not illustrated in FIGURE 7 to aid in the present explanation, though they would of course be present as desired.) FIGURE 7 also illustrates the condition of the blocked core 38 "After Read," and then "After Restore"; similarly for the unblocked core 40. Though the reading pulses 42 and 44 are themselves of opposite polarity, they are effectively of the same polarity in that they produce additive M.M.F.'s around the smaller aperture due to the $X_R$ and $Y_W$ lines threading that aperture in opposite directions. Preferably, the read pulses are of substantially the same "half" amplitude, and in any event, neither alone can switch the flux around the small aperture of an unblocked core, though together they can produce a signal in an output or sense line threading the smaller aperture. Switching of the flux around the smaller aperture of the unblocked core 40 is shown in the "After Read" condition of that core by reversal of the arrows beside the smaller aperture, i.e. in legs II and III. It will be noted that the zero flux condition of leg I of the unblocked core 40 remains unchanged by the reading pulses 42, 44. Since the legs beside the smaller aperture of the blocked core 38 are both saturated in the same direction, the read pulses 42 and 44 cannot cause any flux flow around the smaller aperture. Consequently, the "After Read" condition for core 38 is exactly the same as previously, and a negligible, if any, signal appears on any output or sense line threading the smaller aperture of a blocked core.

Because the flux condition of leg I of either the originally blocked or unblocked core in FIGURE 7 does not change during a reading time such reading is referred to as "non-destructive." Nevertheless, as above explained, the flux condition around the smaller aperture may change during a reading thereof, so it becomes necessary to restore any such core to its original state, or otherwise a subsequent application of read pulses will not produce an output line voltage. The restore may be accomplished in either of two different manners, one of which is indicated in FIGURE 7 and the other of which is shown in FIGURE 4. In FIGURE 7, restoration is accomplished by driving the core with a large negative-going pulse 46 on the $X_R$ line, and no signal on the $Y_W$ line. In FIGURE 4, signals on both of these lines, respectively pulses 48 and 50, are employed to restore a core. In either case, the flux around the small aperture of an unblocked core which has been switched by reading pulses 42 and 44, will be reswitched by the restore pulse or pulses. The advantage of using a single restore pulse 46, as compared to the coincident current pulses 48 and 50, is that the single pulse 46 may be much larger than either of pulses 48 or 50, especially when the core being restored is in a matrix such as shown in FIGURE 6. The only maximum amplitude limitation on pulse 46 is that it be less than that amplitude which would change any core in the array to a condition other than back to its original unblocked state, or to a blocked state other than its original blocked state, i.e., to prevent partial unblocking, unblocking, or reversed blocking. As is evident from FIGURE 7, the "After Restore" condition of cores 38 and 40 is the same as their respective original conditions.

During a read sequence, the selected pair of lines, one from the $X_R$ group of lines in FIGURE 6 and the other from the $Y_W$ group of lines therein, determines which single one of the cores in the array is read out. For example if core No. 7 of FIGURE 6 is to be selected for reading purposes, the $Y_W$ line 52 in conjunction with the $X_R$ line 54 would respectively receive pulses 42 and 44 shown in FIGURE 7. Then, after a reading time, lines 52 and 54 would respectively receive restore pulses 48 and 50, or line 52 would receive restore pulse 46 with no pulse on line 54, to change core No. 7 back to its original unblocked state or to leave it in its original blocked state, as the case may be. Since read pulses 42 and 44 are neither of sufficient amplitude to switch any flux around the smaller aperture of any core, even if the core is in an unblocked condition, none of the Nos. 5, 6 and 8, or 3, 11 and 15 cores is effected by being "half" selected thereby. Also, neither of the restore pulses 48 or 50 will appreciably affect any of the cores half selected thereby. In this case, the $Y_W$ pulse 48 must be somewhat limited in amplitude since it also threads the larger aperture, to prevent any appreciable effect of the flux therearound. However, when only a single pulse 46 is employed during the restore period, there is more tolerance on the maximum amplitude thereof since it is applied only to the $X_R$ line which threads only the smaller aperture.

Reference is now made again to FIGURE 5, to explain the write sequence. This sequence includes two time periods, the first a "clearing" time, and the second a "writing" period. As will be noted from FIGURE 5, neither the $X_W$ or inhibit line carries any signal during the clearing period, but both the $Y_W$ and $X_R$ lines do carry relatively large, negative-going pulses 56 and 58 respectively. During the writing time, the $X_W$ and $Y_W$ lines have imposed upon them pulses 60 and 62 respectively, while the inhibit line may or may not carry an opposing pulse 64, according to whether or not the signals during the writing period are to be effective to switch the core in the manner below explained.

Since a transfluxor arrangement according to this invention may be employed in an array as illustrated in FIGURE 6, it is convenient to explain the operation of given transfluxors by reference to FIGURE 8 in order to make it more evident what occurs in unselected transfluxors during a write sequence. The layout in FIGURE 8 is similar to that in FIGURE 7, except that for the "After Clearing" case not only is the flux condition for the selected core indicated, but also the condition of the row and column cores that are only half selected, and similarly for the "After Writing" case. Again, the core in the upper left corner is assumed to be initially in a blocked or 0 state, while the core in the lower left corner is assumed to be in an unblocked or 1 state, these cores in FIGURE 8 being now numbered 66 and 68 respectively. For both of these cores, the $X_R$, $X_W$ and $Y_W$ lines only are illustrated for convenience in discussing the write sequence.

The purpose of the clearing period is to assure that the selected core is in a blocked condition before the writing pulses per se are applied. As previously indicated, the clearing pulses 56 and 58 are themselves both of the same polarity, but since they are applied to the $X_R$ and $Y_W$ lines which thread the smaller aperture in opposite directions, these pulses are effectively of opposite polarity, i.e., they effect opposite polarity M.M.F.'s The clearing pulses are of substantially equal amplitude, and only the core in a matrix which concurrently receives the M.M.F.'s effected by the clearing pulses, gets cleared. For example if clearing pulses 56 and 58 are respectively applied to lines 52 and 54 in FIGURE 6 to select core No. 7, then that core if previously in an unblocked condition is changed to a blocked condition as shown in FIGURE 8 by the representation to the right of core 68 under the $Y_W$ and $X_R$ column. On the other hand, had core No. 7 already been in a blocked state, the clearing pulses would not affect the core but would leave it in its blocked condition as shown in the $Y_W$ and $X_R$ column to the right of core 66 in FIGURE 8. Since in this selected core the two currents going through the small aperture are of equal amplitude but in opposite directions, they cancel and effectively all the whole core then sees is the single wire $Y_W$ through the larger aperture.

The pulse 56 on this wire is of the wrong polarity to cause flux flow around the large aperture of a blocked core, but flows therearound in an unblocked core to cause legs I and II to saturate in the same counterclockwise direction as leg III was and remains in, thereby setting the core to a blocked condition.

The amplitude of the clearing pulses may be as large as is practical (i.e., not so large as to change a selected core to a reverse or clockwise-flux blocked condition) without danger of changing the state of any core except the one selected to be cleared. This is true since an unselected core on the $Y_W$ line that gets only the M.M.F. generated by the large clearing pulse 56 will have no flux whatsoever switched in it if it were in a blocked or 0 state, though if it were in an unblocked or 1 state flux around its small aperture will be switched. As shown in FIGURE 8, these are the conditions which may be expected relative to cores Nos. 5, 6 and 8 of FIGURE 6 when core No. 7 is selected. Also, half selected cores on an $X_R$ line, for example, cores Nos. 3, 11, and 15 of FIGURE 6, will have no flux switched in any of their three legs, as shown in FIGURE 8.

With the selected core unquestionably in a blocked condition due to the clearing pulses applied to it, writing into that core can then take place. This is accomplished by applying writing pulses 60 and 62 respectively to the selected pair of $X_W$ and $Y_W$ lines, without the inhibit pulse 64 on the inhibit line if it is desired to change the core to a 1 or unblocked state, but with that inhibit pulse if it is desired to write a 0, i.e., to maintain the selected core in a blocked condition. In FIGURE 8, the two core representations to the far right indicate that inhibit pulse 64 was not present during the writing time for either core, since both of these cores are in an unblocked state due to the writing pulses. The write pulse 62 as it appears on the selected $Y_W$ line has no effect whatsoever on half selected row cores, for example cores Nos. 5, 6 and 8 of FIGURE 6, if those cores were initially (before clearing) in a blocked state. However, if any one of those cores was initially in an unblocked state so as to have the flux around its small aperture switched by the prior receipt of only the $Y_W$ clearing pulse 56, then the $Y_W$ writing pulse 62 re-switches the flux around the small aperture so that the core returns to its initial condition. Those half selected cores on the selected $X_W$ line, for example cores Nos. 3, 11 and 15 of FIGURE 6 are completely unaffected by the writing pulse 60 since it is of insufficient amplitude to switch flux in any of the three legs of a blocked core and of the wrong polarity to switch flux in an unblocked core.

The following are some advantages of the wiring and driving arrangement disclosed herein. Ability to write without danger of over-setting is provided. The amplitude of the write pulses can be greater than with prior art arrangements, so as to increase the speed of writing, and the tolerances on writing amplitude are also greater than heretofore possible. The clearing pulses may be made as large as practical without danger of destroying information in unselected cores but the operation is coincident current. By being able to clear with a large pulse, the 1 and 0 signals ratio can be increased greatly, as can be the speed of clearing, relative to prior art methods. Creeping (slight change of the remanent values) is not a problem in this invention.

The invention may be employed in either a coincident-current type memory arrangement as in FIGURE 6, or in a word-organized memory of the type reported by T. C. Penn and D. C. Fischer at the 1960 Western Joint Computer Conference. In accordance with this invention then, in the latter type memory, the word line would link leg II and the digit and output lines leg III with a large negative-going clearing pulse being applied only to the word line. To write a 1, a large positive-going pulse would be applied only to the word line, and to write a 0 a similar pulse would be applied concurrently to the digit line, while the digit and word lines would respectively and successively carry positive-going restore and read pulses. The only limitation on the amplitude of the pulses is that they are large enough to cause switching around the respective flux path but may be considerably larger. Preferably the word write and digit write pulses are of the same amplitude. The cycle speed of a word-organized memory can be varied depending on the drive currents which can be varied over a considerable range. The read cycle does not alter the information stored so the word-organized system is non-destructive, which is advantageous in that every word in the memory can be read out once before a restore pulse would be required. This is also true for a coincident-current memory which is very valuable in a sequential type readout system.

As representative of parameters which may be employed to effect this invention, the following is set forth, without limitation intended. For a transfluxor memory core of the RCA XF–3665 type which has dimensions similar to those previously set forth, curves A and B in FIGURE 9 are applicable to respectively determine the maximum value of each half write pulse and each half read or restore pulse. That is, curve A is followed when writing into a core and represents the switching curve around the large aperture, i.e., in legs I and II; while curve B may be followed when reading out of an unblocked core since it represents the switching curve around the small aperture. From these curves, it is apparent, as previously indicated, that all the flux can be switched around the small aperture with less current than it takes to start switching around the large aperture. These curves are in part due to the respective physical dimensions of the two apertures and the relative sizes of the three different legs. As exemplary, the reading pulses 42 and 44 in FIGURES 4 and 7 may each have amplitude of 150 milliampere turns (ma. t.) while restore pulses 48 and 50 may also have 150 ma. t. The alternative restore pulse 46 in FIGURE 7 may be 1 ampere turn (a.t.), and each of the clearing pulses 56, 58 also 1 a.t. Writing pulses 60, 62 and 64 may each be 350 ma. t.

Thus it is apparent this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A system comprising a plurality of transfluxor type magnetic cores each of which has a first aperture and a second aperture effectively smaller than its said first aperture, said plurality of cores being divided into a plurality of first groups and a plurality of second groups with any one core being common to one of said first groups and one of said second groups and means for selectively writing information into any one of said cores including an only one and different line for each different first group threading all the first and second apertures in its respective first group of cores.

2. A system as in claim 1 wherein said writing means includes a plurality of second lines respectively for said second groups of cores with each such second line threading all said first apertures of the cores in its respective second group.

3. A system as in claim 2 wherein said writing means further includes a plurality of third lines respectively for said second groups of cores with each such third line threading all said second apertures of the cores in its respective second group.

4. A system comprising a plurality of transfluxor type magnetic cores each of which have a first aperture and a second aperture effectively smaller than its said first aperture, said plurality of cores being divided into a plurality of first groups and a plurality of second groups with any one core being common to one of said first groups and one of said second groups, means for effecting a selective reading of any one of said cores including a plurality of first lines respectively for said second groups with each such first line threading all the second apertures in its respective second group and a plurality of second lines respectively for said first groups with each such second line threading the first and second apertures of each core in its respective first, and means for selectively writing into any one of said cores including at least said second lines and a plurality of third lines respectively for said first groups with each such third line threading the first aperture of each core in its respective group.

5. A system as in claim 4 wherein said writing means also includes said plurality of first lines.

6. A system comprising a plurality of transfluxor type magnetic cores each of which has first and second separated apertures forming three core legs with the leg aside the said first aperture having a substantially greater effective reluctance than the legs between the apertures and aside the second aperture, said plurality of cores being divided into a plurality of first groups and a plurality of second groups with any one core being common to one of said first groups and one of said second groups, and means for selectively writing information into any one of said cores including an only one and different line for each different first group threading all the first and second apertures in its respective first group of cores.

7. A system comprising a plurality of transfluxor type magnetic cores each of which has first and second separated apertures forming three core legs with the leg aside the said first aperture having a substantially greater effective reluctance than the legs between the apertures and aside the second aperture, said plurality of cores being divided into a plurality of first groups and a plurality of second groups with any one core being common only to one of said first groups and one of said second groups, means for effecting a selective reading of any one of said cores including a plurality of first lines respectively for said second groups with each such first line threading all the second apertures in its respective second group and a plurality of second lines respectively for said first groups with each such second line threading the first and second apertures of each core in its respective first group of cores, and means for selectively writing into any one of said cores including at least said second lines and a plurality of third lines respectively for said first groups with each such third line threading the first aperture of each core in its respective group.

8. A transfluxor type memory core havig a first aperture and a second aperture effectively smaller than the said first aperture, and means for writing information into said core including a first line threading said first aperture, a second line threading both said apertures, and a third line threading said second aperture, wherein said writing means includes means for applying to said first and second lines concurrent signals which effectively are substantially equal in amplitude and together but not alone are sufficient to switch said core when in a blocked state to an unblocked state and also includes means for applying to said second and third lines concurrent signals which are effectively of opposite polarity but effectively of substantially equal amplitudes each considerably greater than the effective amplitude of either of the aforementioned signals to switch said core when in an unblocked state to a blocked state.

9. A system comprising a plurality of transfluxor type magnetic cores each of which has first and second separated apertures the peripheries of which form first and second magnetic flux paths with the said first path around the said first aperture having a substantially greater effective reluctance than the said second path around the said second aperture, said plurality of cores being divided into a plurality of first groups and a plurality of second groups with any one core being common to one of said first groups and one of said second groups, and means for selectively writing information into any one of said cores including an only one and different line for each different first group threading all the first and second apertures in its respective first group of cores.

10. A system comprising a plurality of transfluxor type magnetic cores each of which has first and second separated apertures the peripheries of which form first and second magnetic flux paths with said apertures with the said first path around the said first aperture having a substantially greater effective reluctance than the said second path around the said second aperture, said plurality of cores being divided into a plurality of first groups and a plurality of second groups with any one core being common only to one of said first groups and one of said second groups, means for effecting a selective reading of any one of said cores including a plurality of first lines respectively for said second groups with each such first line threading all the second apertures in its respective second group and a plurality of second lines respectively for said first groups with each such second line threading the first and second apertures of each core in its respective first group of cores, and means for selectively writing into any one of said cores including at least said second lines and a plurality of third lines respectively for said first groups with each such third line threading the first aperture of each core in its respective group.

11. A system comprising a plurality of transfluxor type magnetic cores each of which has a first aperture and a second aperture effectively smaller than its said first aperture, said plurality of cores being divided into a plurality of first groups and a plurality of second groups with any one core being common to one of said first groups and one of said second groups, and means for selectively writing information into any one of said cores including an only one and different line for each different first group threading all the first and second apertures in its respective first group of cores, said writing means including a plurality of second lines respectively for said second groups of cores with each such second line threading all said first apertures of the cores in its respective second group, said writing means further including a plurality of third lines respectively for said second groups of cores with each such third line threading all said second apertures of the cores in its respective said second group, and said writing means further including means for selectively applying to any one of each of said first mentioned and second lines in selected pairs concurrent signals which effectively are substantially equal in amplitude and together, but not alone, are sufficient to switch only the core and first aperture of which is threaded by the selected pair of first and second lines from a blocked state to an unblocked state, said writing means also including means for selectively applying to any one of each of said second and third lines in selected pairs concurrent signals which are effectively of opposite polarity, but effectively of substantially equal amplitude, each considerably greater than the effective amplitude of either of the aforementioned signals to switch only the core the second aperture of which is threaded by the selected pair of second and third lines from an unblocked state to a blocked state.

References Cited by the Examiner

UNITED STATES PATENTS

| 2,962,215 | 11/1960 | Haynes | 340—174 |
| 2,993,197 | 7/1961 | Broadbent | 340—174 |
| 3,007,140 | 10/1961 | Minnick et al. | 340—174 |
| 3,048,828 | 8/1962 | Cataldo | 340—174 |

OTHER REFERENCES

Onysheevych, L. S.: Analysis of Circuits With Multiple-Hole Magnetic Cores, Technical Report 329, July 9, 1957, M.I.T. Research Laboratory of Electronics, page 12.

IRVING L. SRAGOW, *Primary Examiner.*

JOHN F. BURNS, *Examiner.*